US007061841B2

(12) United States Patent
Chiba et al.

(10) Patent No.: US 7,061,841 B2
(45) Date of Patent: Jun. 13, 2006

(54) OPTICAL DISC RECORDING/REPRODUCING APPARATUS AND DATA RECORDING METHOD FOR USE WITH SUCH APPARATUS

(75) Inventors: Katsuhito Chiba, Kawagoe (JP); Tetsuya Kato, Sayama (JP)

(73) Assignee: Teac Corporation, Tokyo (JP)

( * ) Notice: Subject to any disclaimer, the term of this patent is extended or adjusted under 35 U.S.C. 154(b) by 259 days.

(21) Appl. No.: 10/490,916

(22) PCT Filed: Sep. 24, 2002

(86) PCT No.: PCT/JP02/09768

§ 371 (c)(1),
(2), (4) Date: Mar. 26, 2004

(65) Prior Publication Data

US 2004/0240328 A1   Dec. 2, 2004

(30) Foreign Application Priority Data

Sep. 26, 2001 (JP) .............................. 2001-294106

(51) Int. Cl.
G11B 7/00 (2006.01)
(52) U.S. Cl. ............................... 369/53.15; 369/47.53; 369/47.32
(58) Field of Classification Search ............. 369/53.15, 369/47.5, 47.51, 47.52, 47.53, 47.32, 53.35, 369/53.36, 53.42
See application file for complete search history.

(56) References Cited

U.S. PATENT DOCUMENTS 6,115,350 A * 9/2000 Furuta et al. ............ 369/47.53

FOREIGN PATENT DOCUMENTS

| JP | 11-296980   | 10/1999 |
| JP | 2000-105969 | 4/2000  |
| JP | 2002-92804  | 3/2002  |
| JP | 2002-230899 | 8/2002  |
| JP | 2002-260240 | 9/2002  |

* cited by examiner

Primary Examiner—Nabil Hindi
(74) Attorney, Agent, or Firm—Anderson Kill & Olick, PC

(57) ABSTRACT

An optical disc recording/reproducing apparatus and a data recording method for use with such apparatus are disclosed, wherein data can be recorded on an optical disc with safety and reliably by using the so-called overburn-based recording technique. The apparatus includes an optical disc drive (1) and a optical disc drive control unit (20) for causing various instructions to be delivered to the disc drive and for causing the state information to be obtained from the disc drive, under control of the control unit (20), wherein the control unit (20) includes functional components that may be operated under control of the control unit (20), such as a memory unit (12) for storing the nominal recordable last position retrieved from the optical disc, a command issuing unit (10) for delivering trial writing instructions or commands to the disc drive, a result code obtaining unit (11) for obtaining the error information from the disc drive that indicates whether any error occurs when a particular trial writing instruction or command is performed on the disc drive, and a recordable last position setting unit (15) for determining an end burst position based on the error information and the recording position information and setting a recordable last position between the end burst position and the nominal recordable last position. The present invention allows for the use of the overburn-based recording technique that provides an additional recording time that is sufficient to permit data to be recorded with safety and reliably, regardless of any variances that exist between individual optical discs.

23 Claims, 7 Drawing Sheets

OPTICAL DISC RECORDING/REPRODUCING APPARATUS AND DATA RECORDING METHOD FOR USE WITH SUCH APPARATUS

BACKGROUND

1. Technical Field

The present invention relates to an optical disc recording /reproducing apparatus and a data recording method for use with such apparatus. More particularly, the present invention relates to an apparatus and method for recording the data on an optical disc, such as CD-R, CD-RW, DVD-R, MO and the like, wherein the data recording can be performed beyond the nominal storage capacity of such optical disc that contains any particular information such as addresses and the like previously written on the wobbles thereof.

2. Prior Art

An optical disc such as a write-once CD-R, rewritable CD-RW and the like contains the embedded information (ATIP information) such as addresses and the like that have previously been written in a particular sequence on the wobbles in accordance with the specifications, and the information that represents the locations (addresses) on the optical disc may be retrieved by reading the embedded information from the disc. The embedded information includes the information items as listed in Table 1, which may be written in the read-in areas and other areas.

TABLE 1

| M1:S1:F1 | Content |
| --- | --- |
| 0:0:0 | time code in read-in area and program area |
| 1:0:0 | time code in read-in area, PCA and PMA |
| 1:0:1 | recording power, reference speed, application code and disc type ID |
| 1:1:0 | read-in area start time |
| 1:1:1 | read-out area start time |
| 0:0:1 | speed range, recording strategy and OPC parameter at reference speed |
| 0:1:0 | recording power and OPC parameter at low & high speeds |
| 0:1:1 | reserved |

As shown in Table 1, (1:1:0) and (1:1:1) in the MSB bits, represent the information for the read-in area start time and the information for the read-out area start time, respectively, and the recording can be performed during the period, which is called the recordable time, from the read-in area end time to the read-out area start time. The actual data may be recorded on those areas during the above recordable time. FIG. 6 illustrates the concept of a typical optical disc, such as the musical CD-R disc having its nominal recordable time of 74 minutes, for example. As shown in FIG. 6, the interval between the read-in end position 31a and read-out start position 32 across the tracks on the disc 30 corresponds to at least 74 minutes.

In the regions following the above read-out start position (nominal recordable end position), the read-out information, which indicates the end of the data recording area may be written. In the usual optical disc, however, some free regions may still be available at addresses following the areas in which the read-out information has been written. This means that some recordable regions are available at addresses toward the outer peripheral side of the disc. Some servo errors, such as the focusing error and tracking error, might occur if any recording would be attempted in those recordable regions. In order to ensure that the read-out information can be recorded without causing such servo errors, some margins (free tracks that correspond to several minutes when they are expressed in terms of the time) may be reserved by considering variances in individual optical discs.

In some recently developed CD-R or CD-RW discs, however, it may be seen from the track structure in FIG. 7 that the information may be written beyond the nominal recordable end position (point A in FIG. 7) and as far as the end of the available tracks (point B in FIG. 7) where errors might occur. Thus, the recording can be performed beyond the nominal recordable time of the optical disc. This is called the "overburn-based recording" technique, which is becoming popular. Using this overburn-based recording technique, music can be recorded for more than 74 minutes on a 74-minute musical CD-R disc, for example.

In the conventional hardware and software that implement the overburn-based recording technique, however, the recording might occur as far as it is permitted, and if any out-of-tracking/out-of-focusing situation should occur during the recording process, the recording would be stopped there. This "at random" approach is the only way to solve the out-of-tracking/out-of-focusing problem.

When the recording was performed on the disc in the above manner, the read-out information might also not have been recorded on the disc properly. This would cause the out-of-tracking/out-of-focusing situation at the end of the tracks where the information has been recorded. Very often, this would cause the problem in that the information could not be reproduced properly. For the musical optical disc that contains the music data, for example, this problem would appear as breaks or interruptions in the music when it is replayed. This problem can be avoided if the user has a prior knowledge of the accurate recordable time or recordable capacity of a particular optical disc, before the user actually begins to record the data on the optical disc.

As an alternative to using the above method, one possible method would be to determine any additional time on an empirical basis that can be extended for the recording, without causing the above problem, and to extend the recordable last position as far as the position obtained by adding the above extended time to the read-out area start time. Although this method may permit the data or music to be recorded on the extended area on the disc, it still has the problem in that the additional time that can be extended must be small in order to ensure that the recording can occur with safety, when it is considered that there are some variances in the individual optical discs. For this reason, the additional time cannot be extended sufficiently. The additional time may be extended at the sacrifice of the recording safety, but if so, the tracking errors or focusing errors as described above would be caused for some types of optical discs.

The present invention addresses the problems described above, and a principal object of the present invention is to provide an optical disc recording/reproducing apparatus and a data recording method for use with such apparatus, wherein the overburn-based recording technique that is implemented by the apparatus and method allows the effective recording time and/or capacity of an optical disc to be extended and/or increased with safety and reliably.

SUMMARY OF THE INVENTION

In order to solve the problems mentioned above, the present invention provides several embodiments of the optical disc recording/reproducing apparatus and method.

Specifically, the optical disc recording/reproducing apparatus according to a first embodiment of the present invention includes:

(a) an optical disc drive; and (b) an optical disc drive control unit, coupled to said optical disc drive, for issuing various instructions to said optical disc drive and for obtaining the state information from said optical disc drive, wherein said optical disc drive control unit includes:

(c) a memory unit for storing therein the nominal recordable last position recorded on the optical disc;

(d) a command issuing unit for providing trial write instructions for said optical disc drive for causing said optical disc drive to write the recording position information on a trial basis as specified by the corresponding trial write instruction;

(e) a result code obtaining unit for obtaining the error information from said optical disc drive, if any error occurs as a result of executing the trial write instruction; and (f) a recordable last position setting unit, coupled to each respective one of said memory, command issuing unit and result code obtaining unit, for controlling said each respective one, wherein said recordable last position setting means is operated to set the end burst position based on the error information obtained by said result code obtaining unit, and to set the recordable last position between said end burst position and the nominal recordable last position stored in said memory unit.

The optical disc recording/reproducing apparatus according to a second embodiment of the present invention is a specific form of the first embodiment, wherein the trial writing operation may be performed by illuminating a laser beam upon the optical disc, said laser beam having a power less than the power of the laser beam that is illuminated upon the optical disc when the actual data is written.

The optical disc recording/reproducing apparatus according to a third embodiment of the present invention is a specific form of the first embodiment, wherein it further includes a margin applying unit for setting an interval between the end burst position and the recordable last position.

The optical disc recording/reproducing apparatus according to a fourth embodiment of the present invention is a specific form of the first embodiment, wherein it further includes a virtual reserved track assuming unit for assuming, as virtual reserved tracks, the tracks from the recordable start position until the recordable last position, or more specifically, until a particular position before and after the recordable last position, and for causing the trial writing operation to be performed on those tracks sequentially, beginning with that particular position.

The optical disc recording/reproducing apparatus according to a fifth embodiment of the present invention is a specific form of the fourth embodiment, wherein the trial writing operation may be preformed by illuminating a laser beam upon the optical disc, said laser beam having a power less than the power of the laser beam that is illuminated upon the optical disc when the actual data is written.

The optical disc recording/reproducing apparatus according to a sixth embodiment of the present invention is a specific form of the fourth embodiment, wherein it further includes a margin applying unit for setting an interval between the end burst position and the recordable last position.

The optical disc recording/reproducing apparatus according to a seventh embodiment of the present invention is a specific form of the first embodiment, wherein it further includes an overburn-based recording predetermining unit for determining the time required for recording a data source on an optical disc, and for asking the recordable last position setting unit to reestablish the recordable last position, if the required recording time exceeds the recordable last position.

The optical disc recording/reproducing apparatus according to an eighth embodiment of the present invention is a specific form of the seventh embodiment, wherein the trial writing operation may be performed by illuminating a laser beam upon the optical disc, said laser beam having a power less than the power of the laser beam that is illuminated upon the optical disc when the actual data is written.

The optical disc recording/reproducing apparatus according to a ninth embodiment of the present invention is a specific form of the seventh embodiment, wherein it further includes a margin applying unit for setting an interval between the end burst position and the recordable last position.

The optical disc recording/reproducing apparatus according to a tenth embodiment of the present invention is a specific form of any of the first through ninth embodiments, wherein it further includes an optical disc recording range setting unit for allowing the human operator to request that the recording should be performed beyond the nominal recordable last position, and for setting the optical disc recording range in accordance with the recordable last position when such request is received from the operator, and for setting the optical disc recording range in accordance with the nominal recordable last position when no such request is received from the operator.

The optical disc recording/reproducing apparatus according to an eleventh embodiment of the present invention is a specific form of the tenth embodiment, wherein the optical disc drive control unit is configured to record the data in accordance with the optical disc recordable range as set by the recording range setting means.

According to a twelfth embodiment, the present invention provides a data recording method that may be used in conjunction with the optical disc recording/reproducing apparatus according to the various embodiments, comprising:

(a) a step of reading the information for the nominal recordable last position previously written on an optical disc;

(b) a step of performing a sequence of trial writing operations upon the optical disc;

(c) a step of continuing to obtain every recording position on which each trial writing operation is performed, until the error information is received, telling that an error occurs when the trial writing operation is performed on a particular recording position;

(d) a step of setting the end burst position in accordance with the particular recording position for which the error information is received; and (e) a step of setting the recordable last position between the nominal recordable last position and the end burst position.

The data recording method according to a thirteenth embodiment of the present invention is a specific form of the twelfth embodiment, wherein it further includes a step of moving the recording start position on which the trial writing operation is to be performed to the nominal recordable last position or any position before or after the nominal recordable last position, before the trial writing operation is actually performed.

The data recording method according to a fourteenth embodiment of the present invention is a specific form of the method according to the twelfth or thirteenth embodiment, wherein the step of setting the recordable last position includes a step of setting the recordable last position so that a read-out area can be reserved between the position immediately following the recordable last position and the end burst position.

Specifically, the operation of the optical disc recording/reproducing apparatus according to the first embodiment as generically defined in claim 1 is described. When an optical disc is loaded on the optical disc drive, the state information that is previously stored on the optical disc may be delivered from the optical disc to the optical disc drive control unit. In response, the recordable last position setting unit, which is one component of the optical disc driver control unit, may extract the recordable last position information from the state information, and may store it in the memory. Then, the command issuing unit, which is one component of the optical disc drive control unit, may deliver a trial write instruction to the optical disc drive, causing the optical disc drive to write the data on the tracks thereon sequentially, in accordance with the address information as specified by the trial write instruction. The result code obtaining unit, which is one component of the optical disc drive control unit, may receive the information from the optical disc drive that tells whether the trial write instruction is completed successfully or any error occurs when it is executed. The current recording position information in the memory may be updated each time the trial write instruction is completed successfully. The recordable last position setting unit, which is one component of the optical disc drive control unit, may retrieve the current recording position from the memory at the time when any error information is received by the result code obtaining unit from the optical disc drive, and may determine the end burst position at the end of the recording regions on the optical disc where an error might occur if any write should be attempted. Finally, the recordable last position setting unit may determine the recordable last position between the nominal recordable last position retrieved from the memory and the end burst position.

The maximum recordable time or maximum recording capacity that is available on the optical disc may be determined by obtaining the recordable last position under the control of the optical disc drive control unit as described above. Then, the data can be recorded as required on the optical disc. Thus, the data recording can be performed beyond the nominal recording time or capacity with safety and reliably.

The present invention may utilize commands that are supported as the standard multimedia recording command architecture for use with a CD-R/RW drive. According to the present invention, the user can quickly know the actual recordable time or capacity for a particular optical disc by using such commands appropriately, before the user begins to record the data on the disc. As such, the present invention provides an effective and useful means to maintain the integrity of the recorded data, and enhance the reliability of the optical disc drive.

The present invention is based on the observation that the native recordable time that is available on a particular optical disc may be known by attempting to write on the disc on a trial basis (trial writing operation). This trial writing operation is not intended to write any data on the disc, but just simulates the writing operation. The trial writing operation is actually intended to read the ATIP information from the disc by tracking the focusing and tracing the tracks on the disc. The laser that is illuminated on the optical disc in this trial writing operation has the power that is less than the power of the laser that is illuminated when any actual data is written on the optical disc. Typically, the laser is illuminated with the reproducing level power. Thus, the trial writing operation may be performed on a write-once optical disc, that is, a CD-R optical disc.

As the ATIP information is being read during the trial writing operation, it may be possible that the tracking or focusing will become instable. This may make it impossible to trace the tracks, causing the write error to occur. Then, the point where the write error occurred may be assumed to be the end burst position. The native maximum recordable time that is available on the disc may last up to the end burst position. Thus, according to the present invention, the recordable last position may be established between the nominal recordable last position and the end burst position. It is desirable, however, that the read-out area should be reserved in the areas following the data recording areas, and thus some margins should be reserved as the read-out areas. Those margins may be provided by the margin applying unit. The margin applying unit may also provide some margins as a default, which may be overridden as appropriate by the human operator. The relationships between optical discs and their corresponding margins may be defined for each different type of optical discs, and those definitions may be maintained in a database so that they can be changed as appropriate for each type. When such margins are provided, the end burst position may be determined for each individual optical disc, and so there is no need of considering the variances in individual optical discs. Thus, the margins that are provided can be moderated, as opposed to the conventional methods.

It is supposed that the trial writing operation is performed sequentially, beginning with the start position of the program region. Then, for the 74-minute optical disc, the trial writing operation would have to occur for more than 74 minutes in order to determine the recordable time. In other words, it would take too long time until the recordable time could be determined.

This may be avoided by reading the ATIP information from the optical disc when it is loaded on the optical disc drive, determining the recordable time from the ATIP information, and issuing an instruction to move the optical pickup to the nominal recordable time position or any position immediately after or before the nominal recordable time position.

This instruction may be provided by a command called the "reserved track", which is supported as the standard command on most CD-RW drives that are currently available on the commercial market. This command causes the optical pickup to move toward the outer peripheral side of the optical disc, where the trial write instruction is issued. This operation may be performed by the virtual reserved track assuming unit. This virtual reserved track assuming unit may be operated to reduce the length of the track considerably on which the trial writing operation is to occur. Thus, the time required to set the recordable last position can be reduced considerably, and the native recordable time or recordable capacity that is available on a particular optical disc can be determined accurately within such reduced time. This information may help the user record the data on the optical disc with safety and reliability. The start position on which the trial writing operation may be performed should be the position from which the recordable last position can be determined by finding the end burst position. In this way, the time required to set the recordable last position can be reduced, when the start position is located nearer to the end. In view of the fact that the optical disc drive has restrictions because of its specifications and in order to ensure that the end burst position can be found reliably, it is prerequisite that the trial writing operation should be performed, beginning with the start position followed by the nominal recordable last position. In this regard, it is desirable that the start position should be located as rearward as possible and immediately before the nominal recordable last position.

There are some types of data sources that may not require the overburn-based recording. For those types of data sources, it would be useless to write the data on a trial basis. In such cases, there is overburn-based recording predetermining unit that may be used to determine the recording time that will be required to record such data sources on an optical disc, which will be referred to herein as the "required recording time". This required recording time may be determined from the information entered by the human operator, or otherwise may be determined from the information, such as TOC information, stored on a recording medium or from the time information stored on the recording medium. Any extra operation may be avoided by determining whether the overburn-based recording is required or not, based on this required recording time.

There is also a recording range setting unit that may be used to determine the recordable range. When the overburn-based recording is required, the recordable range may be determined from the recordable last position obtained by the trial writing operation, and when the overburn-based recording is not required, the recordable range may be determined from the nominal recordable last position. This avoids that the overburn-based recording will occur when it is not required. In other words, the overburn-based recording may only be performed when it is required. The determination as to whether the overburn-based recording is required or not may be made by causing the optical disc control device to write the data, based on the recordable range determined as above.

The data recording method according to the present invention may be used in conjunction with the optical disc recording/reproducing apparatus that has been described so far. Specifically, the method includes the steps of obtaining the nominal recordable last position from an optical disc, continuing to perform the trial writing operations on the optical disc until any burst error occurs at the end of the disc, in order to determine the end burst position, and determining the maximum recordable position that is available on the disc from the end burst position. The method allows the native maximum recordable position that is available on each individual optical disc to be determined, regardless of any variances that may exist in individual optical discs. Thus, the additional time that is required for the overburn-based recording may be provided by setting the recordable last position based on the above native recordable last position, and the overburn-based recording can be performed with safety and reliably during the additional time.

Some margins may be provided between the recordable last position and end burst position, and the read-out information may be recorded reliably on those margins. As the margins may be provided without the need of considering the variances in individual optical discs, the margins thus obtained can be moderated. Thus, the additional time required for the overburn-based recording between the nominal recordable last position and the actual recordable last position can be extended. The data that is recorded during the additional time can maintain its good quality.

When a trial writing operation is performed, the time required for the trial writing operation may be reduced considerably by moving the trial writing start position to the nominal recordable last position or any position before or after the nominal recordable last position.

EFFECT OF THE INVENTION

It may be understood from the foregoing description that the optical disc recording/reproducing apparatus according to the present invention generally includes:

(a) an optical disc drive; and (b) an optical disc drive control unit, coupled to said optical disc drive, for issuing various instructions to said optical disc drive and for obtaining the state information from said optical disc drive, wherein said optical disc drive control unit includes:

(c) a memory unit for storing therein the nominal recordable last position recorded on the optical disc;

(d) a command issuing unit for providing trial write instructions for said optical disc drive for causing said optical disc drive to write the recording position information on a trial basis as specified by the corresponding trial write instruction;

(e) a result code obtaining unit for obtaining the error information from said optical disc drive, if any error occurs as a result of executing the trial write instruction; and (f) a recordable last position setting unit, coupled to each respective one of said memory unit, command issuing unit and result code obtaining unit, for controlling said each respective one, wherein said recordable last position setting unit may be operated to set the end burst position based on the error information obtained by said result code receiving unit, and to set the recordable last position between said end burst position and the nominal recordable last position stored in said memory unit.

It may also be understood from the foregoing description that the data recording method according to the present invention generally comprises:

(a) a step of reading the information for the nominal recordable last position previously written on an optical disc;

(b) a step of performing a sequence of trial writing operations upon the optical disc;

(c) a step of continuing to obtain every recording position on which each trial writing operation is performed, until the error information is received, telling that an error occurs when the trial writing operation is performed on a particular recording position and the information;

(d) a step of setting the end burst position in accordance with the particular recording position for which the error information is received; and (e) a step of setting the recordable last position between the nominal recordable last position and the end burst position.

The apparatus and method described so far are particularly advantageous in that the nominal recordable time may be extended as the additional time during which the overburn-based recording can occur. Thus, the information can be recorded and reproduced with safety and reliably. For the musical data, it can maintain its good sound quality.

BEST MODES OF EMBODYING THE INVENTION

First Embodiment

One embodiment of the present invention is now described by referring to the figures.

Figure 1:
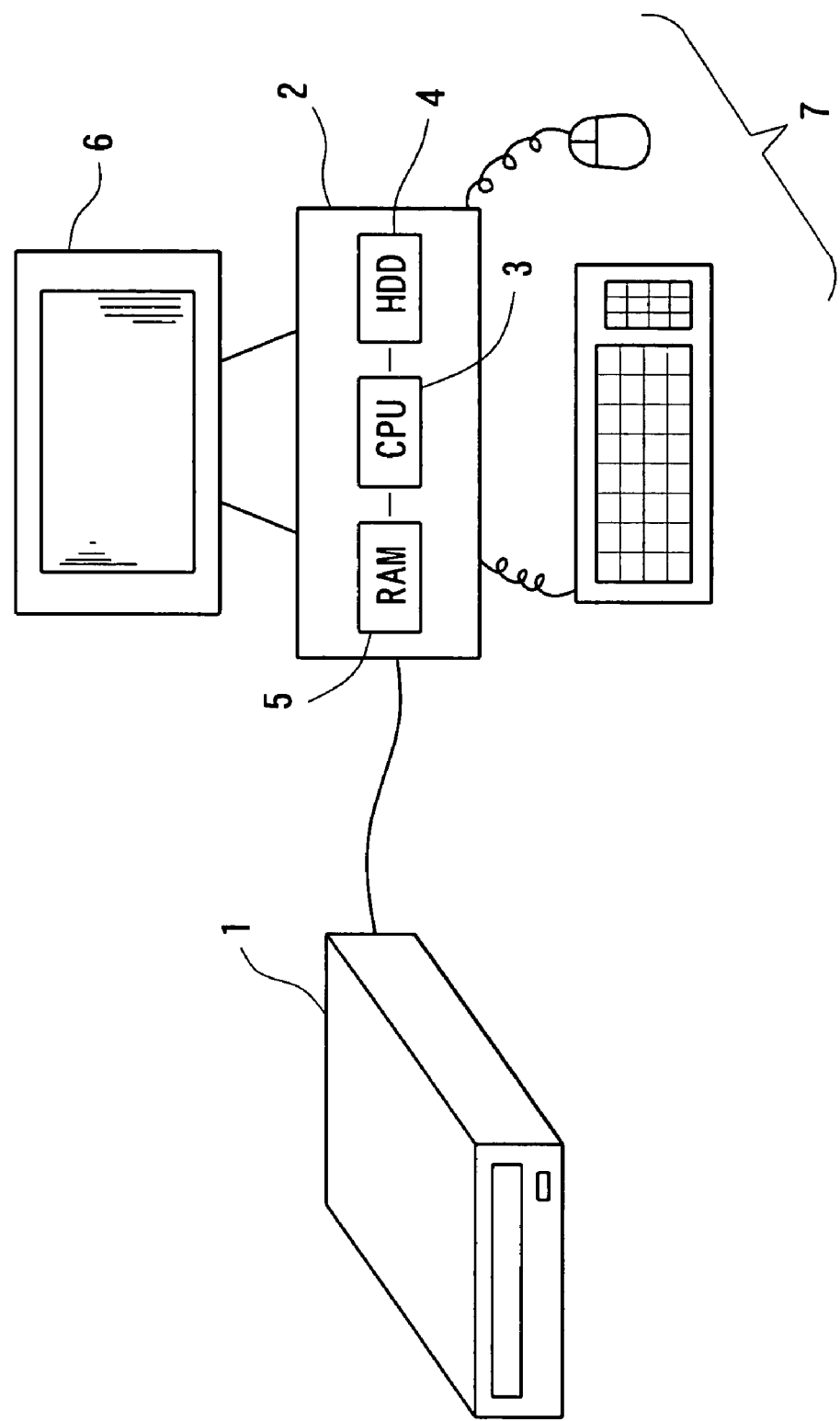
FIG. 1 is a general schematic diagram illustrating the configuration of one embodiment of the present invention.

FIG. 1 represents the CD-RW recording/reproducing system according to one embodiment of the present invention.

A CD-RW drive 1 is connected to a personal computer 2 through any of the well-known interface cables, such as ATAPI, SCSI, USB, IEEE 1394 and the like.

The personal computer 2 includes a central processing unit (CPU) 3, a hard disc drive (HDD) 4, and a random access memory (RAM) 5, and has any of the well-known operating systems installed thereon, on which programs such as application programs may be running. In addition, the personal computer 2 includes a display unit such as display 6, and operating units 7 such as keyboard, mouse. The present invention is primarily intended to provide a particular program (writing program) that may run on the personal computer 2.

Figure 2:
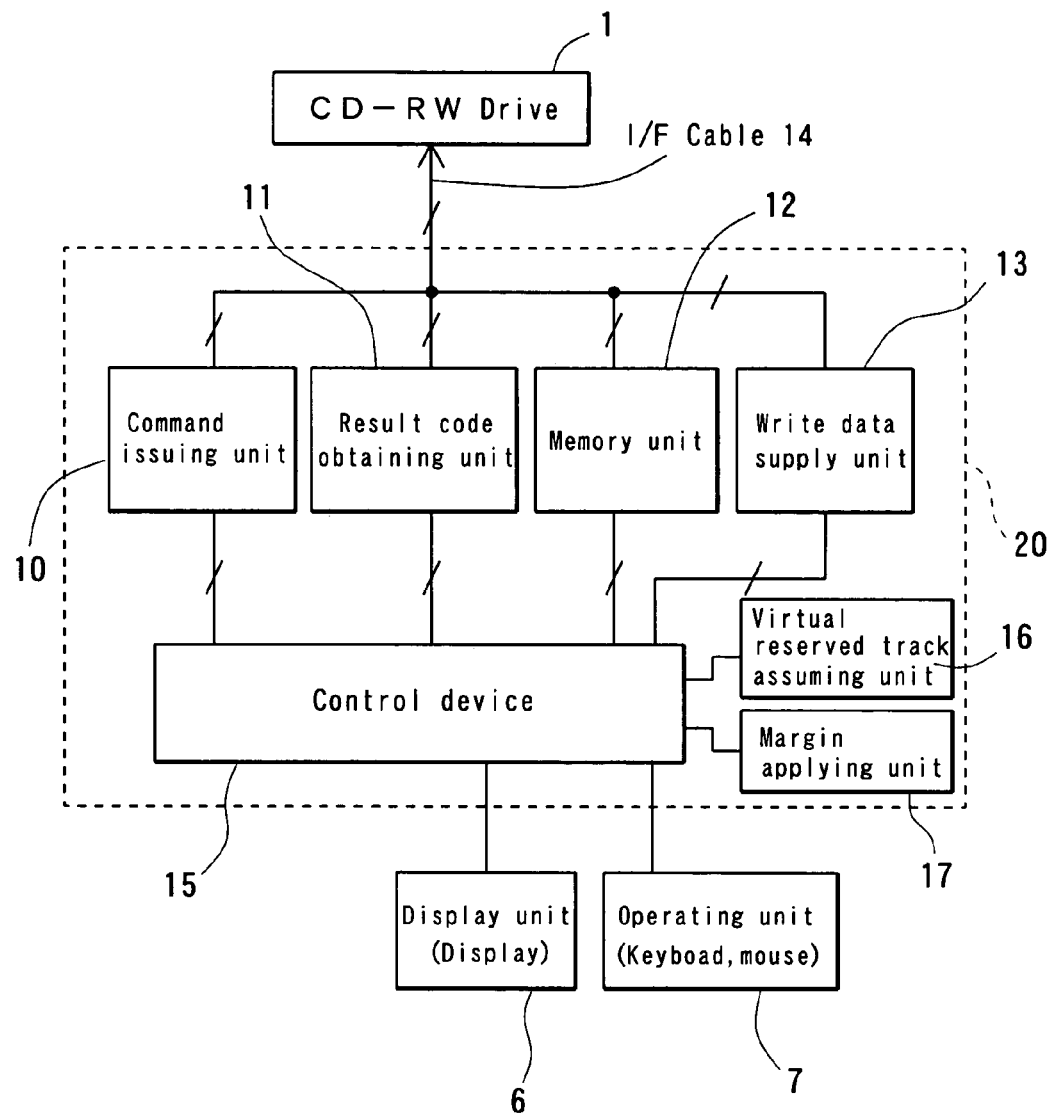
FIG. 2 is a conceptual schematic diagram of FIG. 1.

FIG. 2 is a conceptual block diagram illustrating the components of the personal computer 2 that are implemented in hardware, software or a combination of both.

A command issuing means 10 is a functional component of an optical disc drive control unit 20 within CPU 3, which will be described below, and is programmed to provide a variety of commands, such as writing data, reading data, and the like, to the CD-RW drive 1.

A result code obtaining means 11 is a functional component of the optical disc drive control unit 20 that is programmed to obtain the results of executing the commands, and any information such as error messages from the CD-RW drive 1.

A memory unit 12 includes a random access memory (RAM) 5 for storing the command execution results and any information such as error messages transferred from the CD-RW drive 1 via the result code obtaining unit 11. The memory unit 12 may store ATIP information (including the information such as recordable start position and recordable last position) that is received from a CD-R disc or CD-RW disc when it is loaded on the CD-RW drive 1.

A write data supply unit 13 is a functional component of the optical disc drive control unit 20 that contains the data that is delivered to the CD-RW drive 1 in response to the user requesting that the data is to be recorded on the disc. In this embodiment, the write data may be stored in a hard disc drive (HDD) 4 that is installed as storage means on the personal computer 2. This unit 13 is implemented by CPU 3, HDD 4 and software programs. Although HDD 4 is shown, any other mass storage media such as CD-ROM, MO and the like may be employed.

Each of the units described above is connected to the CD-RW drive 1 via an interface cable 14.

A control device 15 is a functional component of CPU 3 that is connected to each of the command issuing unit 10, result code obtaining unit 11, memory unit 12 and write data supply unit 13, and is programmed to control them. The control device 15 also provides the function of setting the recordable last position on an optical disc.

A virtual reserved track assuming unit 16, which is connected to the control device 15, is programmed to allow the tracks up to a particular track specified by an address to be assumed as virtual reserved tracks, and cause the optical pickup to be moved to the end of the reserved tracks so that it can access that track for recording or reproducing the data.

A margin applying unit 17, which is connected to the control device 15, is programmed to provide some margins between the recordable last position and the end burst position when this unit 17 is operated to set the recordable last position. The recordable last position and the end burst position will be described below. The values for the margins may previously be programmed as defaults, which may be overridden as appropriate by the human operator. This unit may be implemented by CPU 3 and software programs. The unit 17 may contain a database, which may be stored in HDD 4.

The software programs described above may be stored in HDD 4 or any other auxiliary storage means such as a floppy disc (FD).

An optical disc drive control unit 20 may be configured to include the command issuing unit 10, result code obtaining unit 11, memory unit 12, write data supply unit 13, control unit 15, reserved track assuming unit 16 and margin applying unit 17.

Specifically, the control device 15 may control the command issuing unit 10 so that it can deliver an appropriate command, including a trial write operation, to the optical disc drive 1, may receive a result code associated with the command through the result code obtaining unit 11, may check the result code for any error, and may set the recordable last position on an optical disc accordingly.

Figure 3:
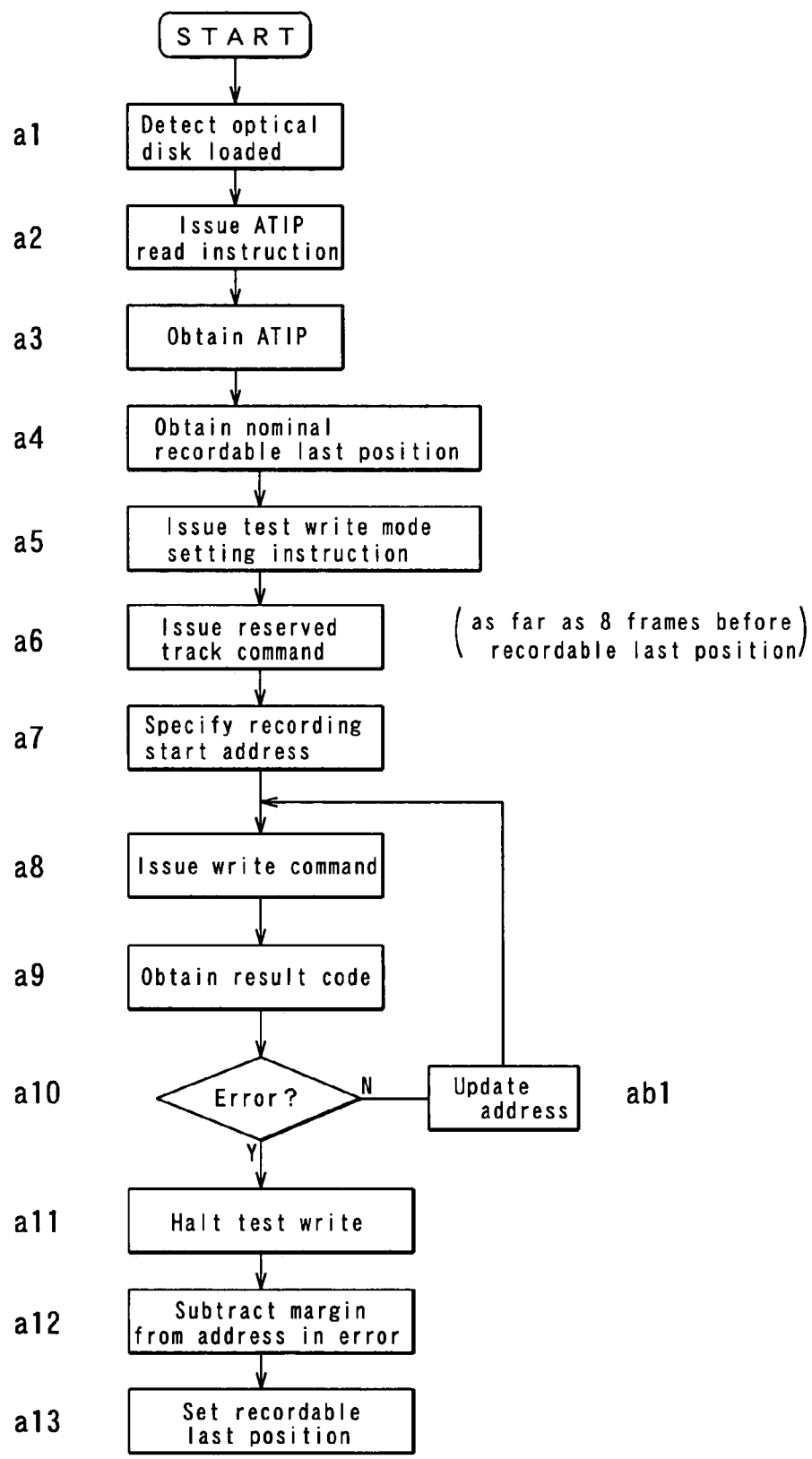
FIG. 3 is a flowchart of the processing steps.

The operation of the apparatus described above is now described by referring to the flowchart shown in FIG. 3.

When an optical disc such as a CD-RW disc (not shown) is loaded on the CD-RW disc drive 1, the drive 1 may detect that the optical disc is now loaded, notifying the personal computer 2 that the optical disc has been loaded (step a1). This notification may be received by the result code obtaining unit 11, which may transfer it to the control device 15. In response to the notification, the control device 15 may direct the command issuing unit 10 to obtain the ATIP information from the optical disc. In response, the command issuing unit 10 may deliver the appropriate command to the CD-RW. disc drive 1 to obtain the ATIP information (step a2). The CD-RW disc drive 1 may read the ATIP information from the wobbles on the optical disc, and may then transfer it to the personal computer 2. The ATIP information may be transferred from the personal computer 2 to the control device 15, which may store it in the memory unit 12 (step a3). The result code contains the information for the nominal recordable last position, which may be received by the control device 15 (step a4).

Figure 4:
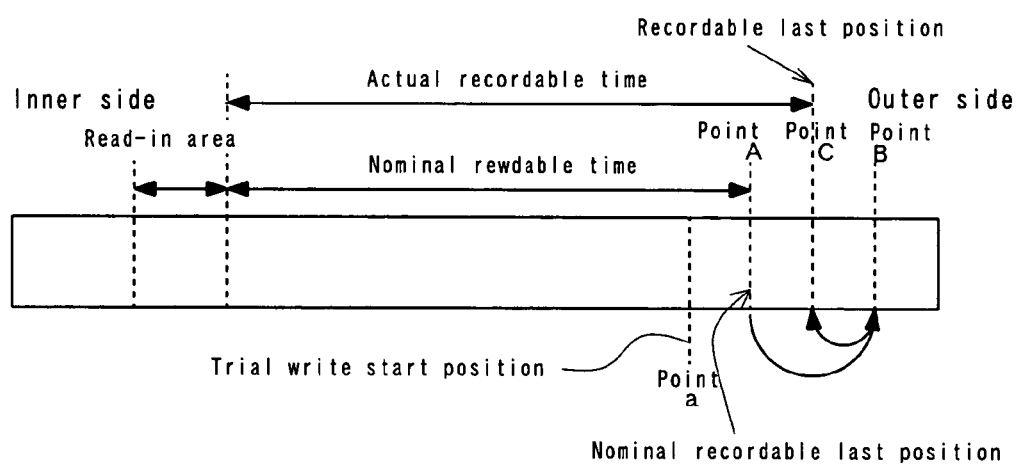
FIG. 4 represents how data is recorded on a track after it is over-burned in accordance with one embodiment of the present invention.

Then, the command issuing unit 10 may deliver a test write mode command under control of the control device 15 to set the write command operation to a trial write mode (step a5). The reserved track assuming unit 16 may also be informed that the operation has been set to the test write mode. Then, the unit 16 may direct the command issuing unit 10 under control of the control device 15 to deliver a reserved track command (step a6) that causes the optical pickup (not shown) on the CD-RW disc drive 1 to be moved to the position immediately before the nominal recordable last position. This is because there are some types of disc drives that could not accept any write command if the recording start position should be located just on the nominal recordable last position. In this embodiment, the recording start position may be set to eight frames before (point a in FIG. 4) the nominal recordable last position (point A in FIG. 4) (step a7).

When the result code obtaining unit 11 receives the result code from the CD-RW disc drive 1, telling that the steps a1 through a7 have been completed, it may notify the control device 15 of that. In response, the control device 15 may cause the command issuing unit 10 to deliver a write command (step a8). The write command specifies the recording start address and the number of blocks. For the trial write command, the trial writing operation may be performed by illuminating the laser beam onto the optical disc. In this case, the laser beam has the same power as the laser beam that is illuminated when the data is reproduced from the optical disc.

As each trial writing operation is performed, the information as to whether the trial writing operation has been completed successfully or not may be sent in the form of a result code from the CD-RW disc drive 1 to the result code obtaining unit 11 (step a9).

At step a10, the determination is made to check whether an error has occurred or not. If it is determined that no error has occurred, the process proceeds to the next recording start address (step ab1), from which it goes on to step a8 where another write command is delivered. Then, the process is repeated as described above.

If it is determined at step a10 that an error has occurred, the recording position where the error occurred (point B in FIG. 4) may be obtained. The test writing operation is stopped there (step a11).

Then, a certain margin value (for example, 60 minutes) may be subtracted from the recording position (recording position information) obtained as above (step a12), and the resulting value may be set as the recordable last position (point C in FIG. 4), which may be stored in the memory unit 12 and may be displayed on the display unit 6 (step a13). The above margin value may previously be set, and may be provided from the margin applying unit 17.

The optical disc drive control unit 20 may cause the data to be recorded as far as the maximum recordable last position thus obtained, beginning with the read-in end position. Then, the optical disc drive control unit 20 may cause the read-out information to be recorded during the longest recording time, beginning with the recordable last position. This concludes the data recording process.

It may be appreciated from the foregoing description that the apparatus and method according to the present invention allow the data recording to be performed with high safety, reliability and efficiency by providing the recordable time more than the nominal recording time that is available on a particular optical disc.

It should be understood that the data that may be recorded according to the present invention includes, but is not limited to, all types of data, such as the musical data and program data.

In the embodiment described above, the CD-RW disc is employed as an optical disc on which the data may be recorded. This is only one example, and the present invention is not limited to the CD-RW disc. That is, any other types of optical discs, such as CD-R, MO, MD and the like, may also be employed.

In the embodiment described above, the HDD is employed as the data source from which the data may be retrieved and recorded on any appropriate optical disc. It should be understood, however, that the data source may come from all types of recording media, such as CR-ROM and the like, and any other external sources that are broadcast as programs including music.

Second Embodiment

In the preceding embodiment, using the overburn-based recording is the prerequisite to recording the data on an optical disc. In the second embodiment, the overburn-based recording is provided as an option. Thus, the user may use or may not use the overburn-based recording when the data is to be recorded on the optical disc.

Specifically, the control device 15 may provide the overburn-based recording predetermining function that determines the time required to record any particular data source (required recording time), compares the required recording time with the recordable time that is available on a particular optical disc, and sets the recordable last position if it is found that the required recording time is longer than the recordable time on the optical disc. The control device 15 may also provide the recoding range setting function that allows the user to request the overburn-based recording, and may set the recordable range in accordance with the above recordable last position if the overburn-based recording is requested, or otherwise may set the recordable range in accordance with the nominal recordable last position on the optical disc if the overburn-based recording is not requested.

Figure 5:
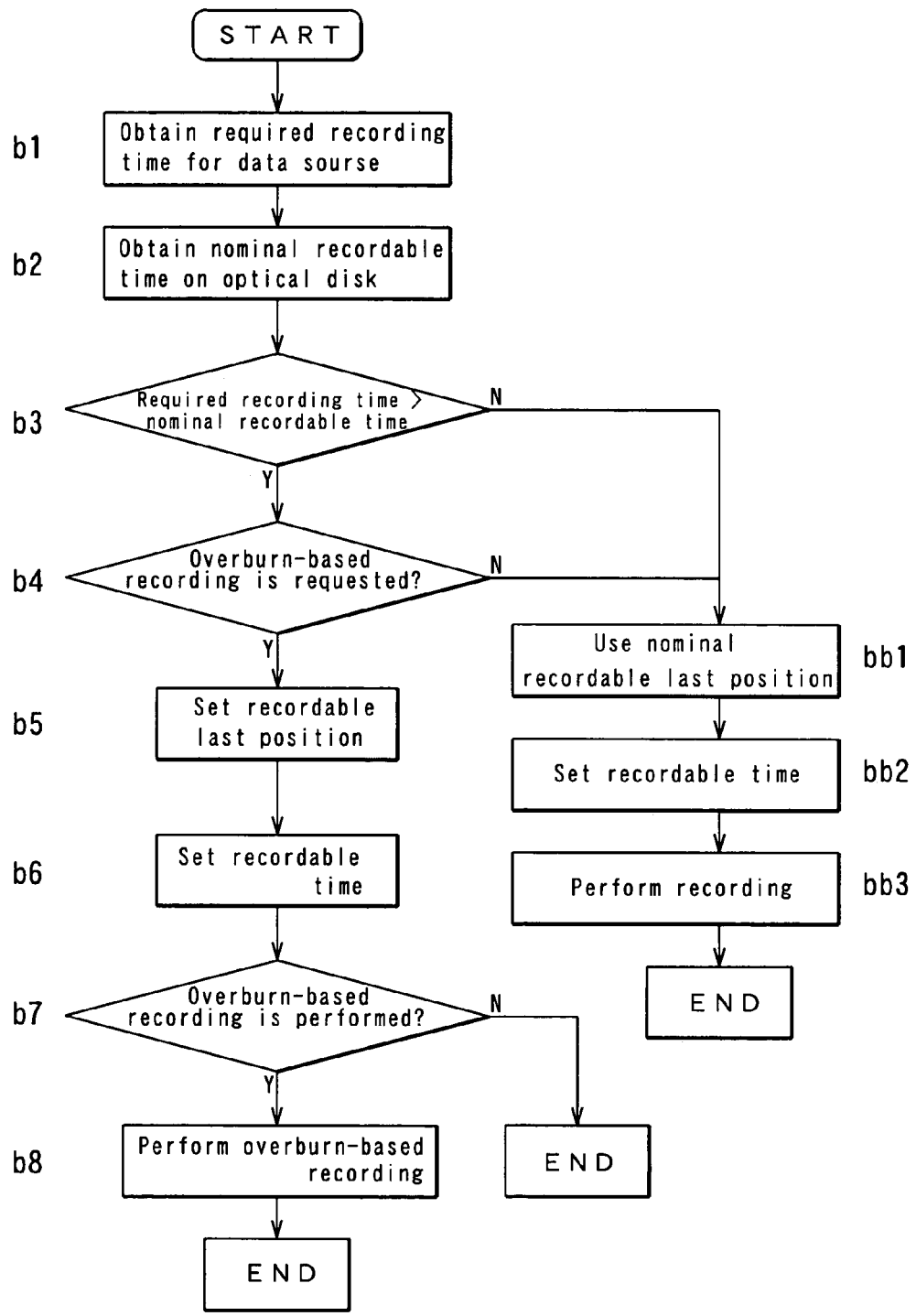
FIG. 5 is a flowchart of the processing steps according to another embodiment of the present invention.
Figure 6:
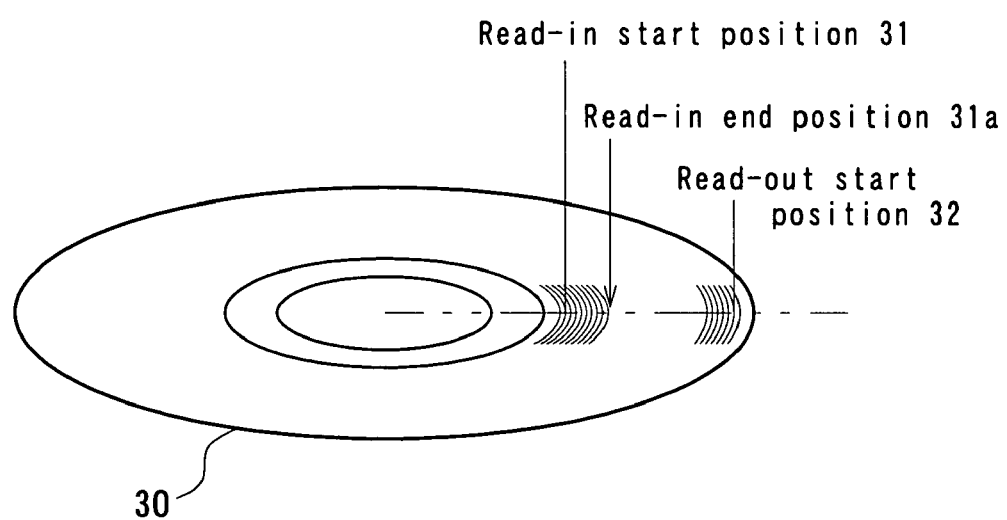
FIG. 6 is a conceptual view of a CD-ROM disc.
Figure 7:
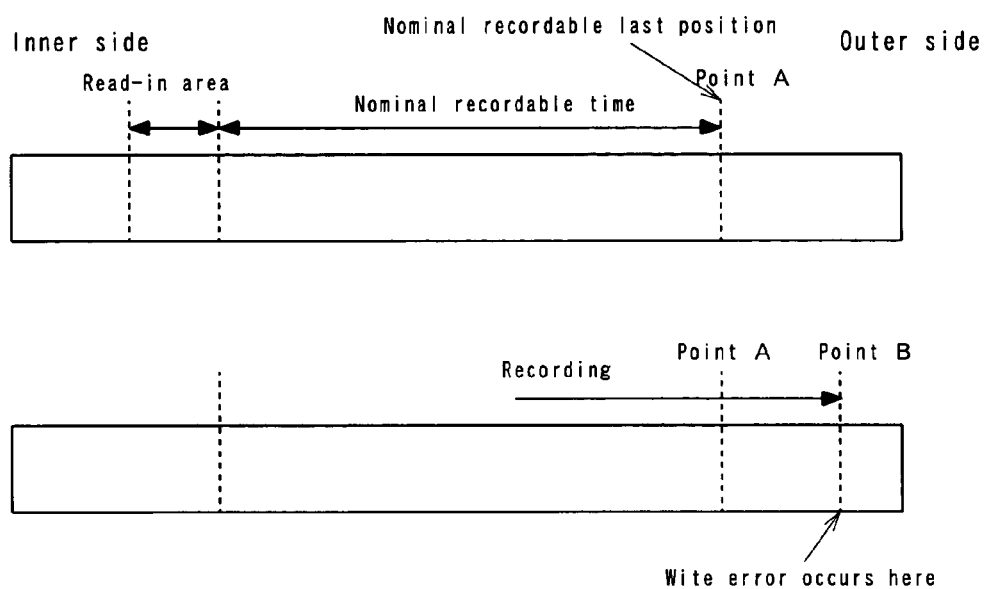
FIG. 7 represents how data is recorded on a track in the usual manner and how the data is recorded on such track after it is over-burned in accordance with the prior art.

The operation of this embodiment is now described by referring to the flowchart in FIG. 5.

The first step is to determine the time required to record any particular data source on an optical disc (step b1). When the data source is stored in HDD, the required recording time may be determined from the capacity of the file that contains the data source. When the data source is stored in an optical disc or any other recording medium, the required recording time may be determined from TOC previously stored in that recording medium. The next step is to determine the nominal recording time that is available on a particular optical disc on which the data source is being recorded (step b2). Specifically, the nominal recording time may be determined by causing the optical disc drive to retrieve the ATIP information from the optical disc loaded on the optical disc drive, as it is done in the preceding embodiment. More specifically, the nominal recording time may be determined from the program region start position and nominal recordable last position (read-out start position) in the ATIP information.

At step b3, the required recording time may be compared with the nominal recording time. This may be accomplished by the control device 15. When it is determined at step b3 that the required recording time is less than the nominal recordable time, this means that the overburn-based recording is not required. Then, the process proceeds to step bb1, where the recordable time is set by using the nominal recordable last position (step bb2), and the usual recording then occurs (step bb3). Then, the process ends. When it is determined at step b3, on the other hand, that the required recording time is greater than the nominal recording time, the operator may determine whether the overburn-based recording should be selected or not (step b4). This selection may be made by causing the control device 15 to provide a prompt to ask the operator to input the choice and by permitting the operator to respond to the prompt through the operating unit 7 (keyboard or mouse). If the overburn-based recording is not requested, the process goes to step bb1. If the overburn-based recording is requested, the process proceeds to step b5, where the control device 15 causes its overburn-based recording predetermining function to set the recordable last position. The recordable last position may be determined by causing the control device 15 to follow the routine shown in FIG. 3. After the recordable last position is determined, the process goes to step b6, where the recordable time is set by the recordable time setting function in accordance with the recordable last position. The recordable time may be displayed on the display 6, as it is done in the preceding embodiment. Then, the process goes to step b7, where the operator may determine whether the overburn-based recording should be selected or not. This selection may be made by allowing the operator to respond to the prompt from the control device 15 in the same manner as step b4. If the required recording time is still greater than the nominal recordable time when the overburn-based recording is requested, it is possible to cause the control device 15 to refuse the request for the overburn-based recording. This may be combined with the input operation of the operator. When the overburn-based recording is not requested, the process ends. When the overburn-based recording is requested at step b7, the process proceeds to step b8 where the overburn-based recording is performed. Then, the process ends.

It may be appreciated from the above description that the overburn-based recording may be performed effectively whenever it is required.

In each of the first and second embodiments, it is assumed that the optical disc drive that is installed on or connected to the personal computer is used. As an alternative to using such optical disc drive, the recording/reproducing apparatus that is dedicated to optical discs and provides the functions described above may be used, or the CD-R recorder that provides the reproducing functions for the data source may be used.

POSSIBLE INDUSTRIAL APPLICATIONS OF THE INVENTION

Although the present invention has been described with reference to the optical disc recording/reproducing apparatus and the data recording method for use with such apparatus according to the particular embodiments of the present invention, the present invention may be applied to all types of optical discs, such as CD-R, CD-RW, DVD-R, MO and the like, on which the information such as addresses has previously been written on the wobbles.

What is claimed is:

1. An optical disc recording/reproducing apparatus including:
   (a) an optical disc drive; and
   (b) an optical disc drive control unit coupled to said optical disc drive, for issuing various instructions to said optical disc drive and retrieving the state information from said optical disc drive, said disc drive control unit including:
   (c) memory means for storing the nominal recordable last position previously recorded on an optical disc;
   (d) command issuing means for issuing trial write instructions to said optical disc drive, each of said trial write instructions specifying a particular recording position on which a trial writing operation is to occur;
   (e) result code obtaining means for obtaining the error information from the optical disc drive if any error is detected when the trial writing operation is performed as specified by said trial write instruction issued from said command issuing means; and
   (f) recordable last position setting means for controlling each of said memory means, said command issuing means and said result code obtaining means, and for determining the end burst position based on the error information obtained by said result code obtaining means, and for setting the recordable last position between said end burst position and said nominal recordable last position stored in said memory means.

2. The optical disc recording/reproducing apparatus as defined in claim 1, wherein the trial writing operation is performed by illuminating a laser beam upon the optical disc, said laser beam having a power less than the power of a laser beam that is illuminated when actual data is written or the optical disc.

3. The optical disc recording/reproducing apparatus as defined in claim 1, wherein said optical disc drive control unit further includes margin applying means for determining an interval between said end burst position and said recordable last position.

4. The optical disc recording/reproducing apparatus as defined in claim 1, wherein said optical disc drive control unit further includes virtual reserved track assuming means for assuming the tracks from said recordable start position until said recordable last position or until a particular position before or after said recordable last position as virtual reserved tracks, and for allowing a sequence of trial writing operations to be performed, beginning with said particular position as a start position.

5. The optical disc recording/reproducing apparatus as defined in claim 4, wherein the trial writing operation is performed by illuminating a laser beam upon the optical disc, said laser beam having a power less than the power of a laser beam that is illuminated when actual data is written on the optical disc.

6. The optical disc recording/reproducing apparatus as defined in claim 4, wherein said optical disc drive control unit further includes margin applying means for determining an interval between said end burst position and said recordable last position.

7. The optical disc recording/reproducing apparatus as defined in claim 1, wherein said optical disc drive control unit further includes overburn-based recording predetermining means for determining the time required to record a data source on an optical disc and for instructing said recordable last position setting means that a recordable last position is to be set, if it is determined that said required recording time exceeds the recordable last position.

8. The optical disc recording/reproducing apparatus as defined in claim 7, wherein the trial writing operation is performed by illuminating a laser beam upon the optical disc, said laser beam having a power less than the power of a laser beam that is illuminated when actual data is written on the optical disc.

9. The optical disc recording/reproducing apparatus as defined in claim 7, wherein said optical disc drive control unit further includes margin applying means for determining an interval between said end burst position and said recordable last position.

10. The optical disc recording/reproducing apparatus as defined in claim 1, wherein said optical disc drive control unit further includes optical disc recording range setting means for setting an optical disc recordable range according to said recordable last position when a request that data is to be recorded beyond said nominal recordable last position is received from a human operator and for setting an optical disc recordable range according to said nominal recordable last position when no such request is received from the human operator, if the human operator is allowed to make such requests.

11. The optical disc recording/reproducing apparatus as defined in claim 10, wherein said optical disc drive control unit is configured to cause the data to be recorded in accordance with the recordable range as set by said recording range setting means.

12. A data recording method for use with the optical disc recording/reproducing apparatus, comprising:
(a) a step of reading the nominal recordable last position information stored in an optical disc;
(b) a step of performing a sequence of trial writing operations against the optical disc;
(c) a step of obtaining a recording position on which each trial writing operation is performed, said step being repeated until an error occurs during a particular trial writing operation and the information associated with the error is received;
(d) a step of setting an end burst position in accordance with the recording position on which the error has occurred during the particular trial writing operation, when the information associated with the error is received and a step of setting a recordable last position between said nominal recordable last position and said end burst position.

13. The data recording method for use with the optical disc recording/reproducing apparatus as defined in claim 12, further including a step of moving the recording start position for the trial writing operation to the nominal recordable last position or any position before or after said nominal recordable last position, before the trial writing operation is started.

14. The data recording method for use with the optical disc recording/reproducing apparatus as defined in claim 12, wherein the step of setting a recordable last position includes a step of setting a recordable last position in such a manner that a read-out area can be provided between any position before or after the recordable last position and the end burst position.

15. The optical disc recording/reproducing apparatus as defined in claim 2, wherein said optical disc drive control unit further includes optical disc recording range setting means for setting an optical disc recordable range according to said recordable last position when a request that data is to be recorded beyond said nominal recordable last position is received from a human operator and for setting an optical disc recordable range according to said nominal recordable last position when no such request is received from the human operator, if the human operator is allowed to make such requests.

16. The optical disc recording/reproducing apparatus as defined in claim 3, wherein said optical disc drive control unit further includes optical disc recording range setting means for setting an optical disc recordable range according to said recordable last position when a request that data is to be recorded beyond said nominal recordable last position is received from a human operator and for setting an optical disc recordable range according to said nominal recordable last position when no such request is received from the human operator, if the human operator is allowed to make such requests.

17. The optical disc recording/reproducing apparatus as defined in claim 4, wherein said optical disc drive control unit further includes optical disc recording range setting means for setting an optical disc recordable range according to said recordable last position when a request that data is to be recorded beyond said nominal recordable last position is received from a human operator and for setting an optical disc recordable range according to said nominal recordable last position when no such request is received from the human operator, if the human operator is allowed to make such requests.

18. The optical disc recording/reproducing apparatus as defined in claim 5, wherein said optical disc drive control unit further includes optical disc recording range setting means for setting an optical disc recordable range according to said recordable last position when a request that data is to be recorded beyond said nominal recordable last position is received from a human operator and for setting an optical disc recordable range according to said nominal recordable last position when no such request is received from the human operator, if the human operator is allowed to make such requests.

19. The optical disc recording/reproducing apparatus as defined in claim 6, wherein said optical disc drive control unit further includes optical disc recording range setting means for setting an optical disc recordable range according to said recordable last position when a request that data is to be recorded beyond said nominal recordable last position is received from a human operator and for setting an optical disc recordable range according to said nominal recordable last position when no such request is received from the human operator, if the human operator is allowed to make such requests.

20. The optical disc recording/reproducing apparatus as defined in claim 7, wherein said optical disc drive control unit further includes optical disc recording range setting means for setting an optical disc recordable range according to said recordable last position when a request that data is to be recorded beyond said nominal recordable last position is received from a human operator and for setting an optical disc recordable range according to said nominal recordable last position when no such request is received from the human operator, if the human operator is allowed to make such requests.

21. The optical disc recording/reproducing apparatus as defined in claim 8, wherein said optical disc drive control unit further includes optical disc recording range setting means for setting an optical disc recordable range according to said recordable last position when a request that data is to be recorded beyond said nominal recordable last position is received from a human operator and for setting an optical disc recordable range according to said nominal recordable last position when no such request is received from the human operator, if the human operator is allowed to make such requests.

22. The optical disc recording/reproducing apparatus as defined in claim 9, wherein said optical disc drive control unit further includes optical disc recording range setting means for setting an optical disc recordable range according to said recordable last position when a request that data is to be recorded beyond said nominal recordable last position is received from a human operator and for setting an optical disc recordable range according to said nominal recordable last position when no such request is received from the human operator, if the human operator is allowed to make such requests.

23. The data recording method for use with the optical disc recording/reproducing apparatus as defined in claim 13, wherein the step of setting a recordable last position includes a step of setting a recordable last position in such a manner that a read-out area can be provided between any position before or after the recordable last position and the end burst position.

* * * * *